United States Patent
Dong (10) Patent No.: US 12,389,328 B2
(45) Date of Patent: Aug. 12, 2025

(54) DEVICE POWER SAVING METHOD AND DEVICE POWER SAVING APPARATUS

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 501 days.

(21) Appl. No.: 17/775,449

(22) PCT Filed: Nov. 11, 2019

(86) PCT No.: PCT/CN2019/117187
§ 371 (c)(1),
(2) Date: May 9, 2022

(87) PCT Pub. No.: WO2021/092727
PCT Pub. Date: May 20, 2021

(65) Prior Publication Data
US 2022/0400435 A1    Dec. 15, 2022

(51) Int. Cl.
H04W 52/02       (2009.01)
H04W 76/34       (2018.01)
H04W 84/12       (2009.01)

(52) U.S. Cl.
CPC ... *H04W 52/0225* (2013.01); *H04W 52/0235* (2013.01); *H04W 52/028* (2013.01);
(Continued)

(58) Field of Classification Search
CPC . H04W 52/0225; H04W 84/12; H04W 76/34; H04W 52/0229; H04W 52/0254;
(Continued)

(56) References Cited

U.S. PATENT DOCUMENTS

2014/0206346 A1    7/2014  Kiukkonen et al.
2016/0105924 A1    4/2016  Baek et al.
(Continued)

FOREIGN PATENT DOCUMENTS

CN    102711228 A    10/2012
CN    105577330 A    5/2016
(Continued)

OTHER PUBLICATIONS

Intellectual property India, Office Action Issued in Application No. 202247032569, Sep. 19, 2022, 5 pages. (Submitted with Partial Machine Translation).
State Intellectual Property Office of the People's Republic of China, Office Action and Search Report Issued in Application No. 201980002946.2, Sep. 21, 2022, 14 pages. (Submitted with Machine Translation).
(Continued)

*Primary Examiner* — Omer S Mian
(74) *Attorney, Agent, or Firm* — Volpe Koenig (57) ABSTRACT

The present disclosure provides device power saving methods and apparatuses. A method is applied to a first device which simultaneously communicates data frames with a second device via multiple links and includes: generating a first message frame including an identifier information bit used to indicate that the first device is a candidate to enter a sleep mode in one or more links of the multiple links; by sending the first message frame to the second device and receiving a second message frame fed back by the second device, whether to enter a sleep mode in a sleep-mode-candidate link indicated by the identifier information bit is determined based on the second message frame used to confirm or reject the first device to enter a sleep mode in the sleep-mode-candidate link indicated by the identifier information bit. The method may determine whether a device enters a sleep mode under multi-link communication.

10 Claims, 7 Drawing Sheets

(52) U.S. Cl.
CPC ............ *H04W 76/34* (2018.02); *H04W 84/12* (2013.01); *Y02D 30/70* (2020.08)

(58) Field of Classification Search
CPC ........... H04W 52/0258; H04W 52/028; H04W 76/28; H04W 52/0235; Y02D 30/70
See application file for complete search history.

(56) References Cited

U.S. PATENT DOCUMENTS

| | | | |
|---|---|---|---|
| 2016/0277957 A1 | 9/2016 | Patel et al. | |
| 2017/0019229 A1* | 1/2017 | Torikoshi | H04W 52/02 |
| 2017/0064679 A1 | 3/2017 | Zhang et al. | |
| 2017/0127352 A1* | 5/2017 | Park | H04W 84/12 |
| 2018/0206190 A1* | 7/2018 | Cherian | H04L 1/1621 |
| 2019/0335454 A1 | 10/2019 | Huang et al. | |
| 2020/0344688 A1* | 10/2020 | Lv | H04J 3/0682 |
| 2021/0337475 A1* | 10/2021 | Cariou | H04L 5/0098 |
| 2022/0132423 A1* | 4/2022 | Fang | H04W 76/20 |
| 2023/0146138 A1* | 5/2023 | Asterjadhi | H04B 7/0413 370/311 |

FOREIGN PATENT DOCUMENTS

| | | |
|---|---|---|
| CN | 107820305 A | 3/2018 |
| CN | 107969028 A | 4/2018 |
| CN | 109309948 A | 2/2019 |
| CN | 110167201 A | 8/2019 |

OTHER PUBLICATIONS

ISA State Intellectual Property Office of the People's Republic of China, Written Opinion of the International Searching Authority Issued in Application No. PCT/CN2019/117187, Aug. 11, 2020, WIPO, 7 pages.(Submitted with Machine Translation).
Intel, Multi-link power save operation doc.: IEEE 802.11-19/1544r0, https://mentor.ieee.org/802.11/dcn/19/11-19-1544-00-00be-multi-1ink-power-save-operation.pptx, Sep. 14, 2019, 16 pages.
Marvell, Multi-Link Power Save doc .: IEEE 802.11-19/1617r0, https://mentor.ieee.org/802.11/dcn/19/11-19-1617-00-00be-multi-1ink-power-save.pptx, Sep. 15, 2019, 8 pages.
Panasonic Corporation, Power Consideration for Multi-link Transmissions doc.: IEEE 802.11-19/1536r1, https://mentor.ieee.org/802.11/dcn/19/11-19-1536-01-00be-power-consideration-for-multi-link-transmissions.pptx, Nov. 10, 2019, 10 pages.
European Patent Office, Extended European Search Report Issued in Application No. 19952212.9, Jun. 23, 2023, Germany, 11 pages.
State Intellectual Property Office of the People's Republic of China, Decision of Rejection Issued in Application No. 201980002946.2, Jan. 20, 2023, 15 pages.
State Intellectual Property Office of the People's Republic of China, First Office Action Issued in Application No. 201980002946.2, Apr. 1, 2022, 10 pages.
ISA State Intellectual Property Office of the People's Republic of China, International Search Report Issued in Application No. PCT/CN2019/117187, Aug. 11, 2020, WIPO, 4 pages.

\* cited by examiner

DEVICE POWER SAVING METHOD AND DEVICE POWER SAVING APPARATUS

CROSS-REFERENCE TO RELATED APPLICATION

The present application is a U.S. National Stage of International Application No. PCT/CN2019/117187 filed on Nov. 11, 2019, the contents of which are incorporated herein by reference in their entireties for all purposes.

TECHNICAL FIELD

The present disclosure relates to the field of communication technologies, and in particular to device power saving methods and device power saving apparatuses.

BACKGROUND

In order to increase access rate and throughput and the like of Wireless Local Area Network (WLAN) such as Wireless Fidelity (Wi-Fi), IEEE802.11 establishes Study Group (SG) IEEE802.11be to research on a next generation mainstream (802.11a/b/g/n/ac/ax) Wi-Fi technology.

In the next generation mainstream (802.11a/b/g/n/ac/ax) Wi-Fi technology, in order to reduce power consumption of communication devices, in a communication process between devices, devices are supported to enter a sleep mode so as to achieve the purpose of power saving.

In the related Wi-Fi technology, in order to increase data transmission rate and reduce delay, a multi-link (ML) manner is proposed for data transmission. It becomes a research hot spot to find a way to save power when performing data transmission using the multi-link manner.

SUMMARY

In order to overcome the problems existing in related art, the present disclosure provides device power saving methods and device power saving apparatuses.

According to a first aspect of embodiments of the present disclosure, there is provided a device power saving method, which is applied to a first device which simultaneously communicates data frames with a second device via multiple links. The device power saving method includes: generating a first message frame, where the first message frame includes an identifier information bit used to indicate that the first device is a candidate to enter a sleep mode in one or more links of the multiple links; sending the first message frame to the second device; receiving a second message frame fed back by the second device, and determining whether to enter a sleep mode in a sleep-mode-candidate link indicated by the identifier information bit based on the second message frame, where the second message frame is used to confirm or reject the first device to enter a sleep mode in the sleep-mode-candidate link indicated by the identifier information bit.

According to a second aspect of embodiments of the present disclosure, there is provided a device power saving method, which is applied to a second device which simultaneously communicates data frames with a first device via multiple links, and the device power saving method includes: receiving a first message frame from the first device, where the first message frame includes an identifier information bit used to indicate that the first device is a candidate to enter a sleep mode in one or more links of the multiple links; feeding back a second message frame to the first device, where the second message frame is used to confirm or reject the first device to enter a sleep mode in a sleep-mode-candidate link indicated by the identifier information bit.

According to a third aspect of embodiments of the present disclosure, there is provided a device power saving apparatus, the device power saving apparatus includes: a processor, and a memory storing processor-executable instructions; where, when the processor executes the processor-executable instructions, the processor is configured to perform operations including: generating a first message frame, where the first message frame includes an identifier information bit used to indicate that the first device is a candidate to enter a sleep mode in one or more links of the plurality of links; sending the first message frame to the second device; receiving a second message frame fed back by the second device, and determining whether to enter a sleep mode in a sleep-mode-candidate link indicated by the identifier information bit based on the second message frame, where the second message frame is used to confirm or reject the first device to enter a sleep mode in the sleep-mode-candidate link indicated by the identifier information bit.

It should be understood that the above general descriptions and subsequent detailed descriptions are merely illustrative and explanatory rather than limiting of the present disclosure.

BRIEF DESCRIPTION OF THE DRAWINGS

The accompanying drawings illustrate examples consistent with the present disclosure and serve to explain the principles of the present disclosure together with the description.

DETAILED DESCRIPTION OF THE EMBODIMENTS

Embodiments of the present disclosure will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The device power saving method provided in the embodiments of the present disclosure is applied to a wireless local area network communication system including a data transmitting device and a data receiving device. The data transmitting device and the data receiving device may be Station (STA) or Access Point (AP). Forward and backward transmissions of data are performed by a wireless local area network between the data transmitting device and the data receiving device.

STA involved in the present disclosure may be understood as a user terminal in a wireless local area network, and the user terminal may be referred to as user equipment (UE), mobile station (MS), mobile terminal (MT) or the like, which is a device capable of providing voice and/or data connectivity to a user. For example, the terminal may be a handheld device or a vehicle-mounted device or the like having wireless connection function. At present, the examples of some terminals may be mobile phone, Pocket Personal Computer (PPC), palm-held computer, Personal Digital Assistant (PDA), laptop computer, tablet computer, wearable device, Internet of Things (IoT) client or vehicle-mounted device or the like.

The AP involved in the present disclosure refers to a device, or a router or the like used by the user terminal of a wireless local area network to access the network.

In the related art, transmission of data frames is performed based on IEEE802.11 standard between STA and AP. Currently, IEEE802.11 establishes Study Group (SG) IEEE802.11be to research on a next generation mainstream (802.11a/b/g/n/ac/ax) Wi-Fi technology, covering 320 MHz bandwidth transmission, multiple frequency bands aggregation and synergy and so on. The vision proposed will increase rate and throughput of at least four folds compared with the existing IEEE802.11ax. Its major application scenarios include video transmission, AR, VR and the like.

Figure 1:
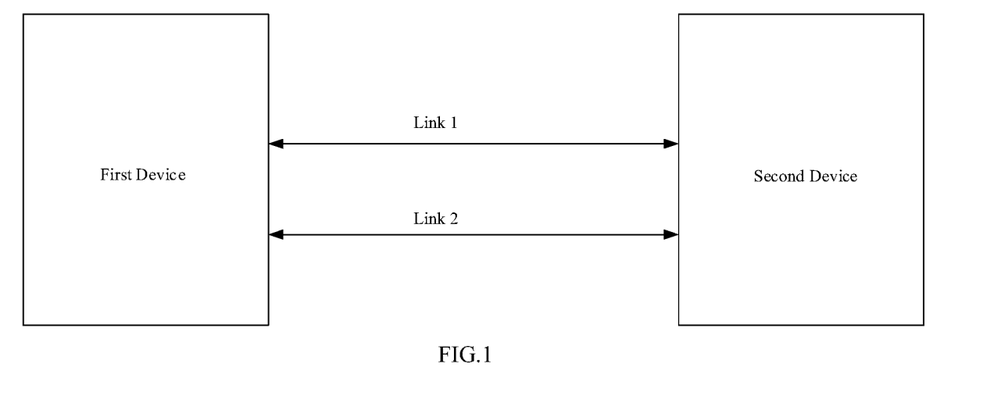
FIG. 1 is a schematic diagram illustrating multi-link communication according to an embodiment of the present disclosure.

The multiple frequency bands aggregation and synergy refers to simultaneous communication in multiple frequency bands or multiple bandwidths in a same frequency band, for example, simultaneous communication in three frequency bands 2.4 GHz, 5.8 GHz and 6-7 GHz. The simultaneous communication in multiple frequency bands or multiple bandwidths in a same frequency band may be understood as multi-link communication, or called multi-link aggregation (MLA). FIG. 1 shows schematic diagram of multi-link communication. A first device and a second device in FIG. 1 communicate with each other over N links at the same time, where N is a positive integer greater than or equal to 2.

The current research hotspot is how a device under multi-link communication enters a sleep mode.

The technical solutions provided by the embodiments of the present disclosure may have the following beneficial effects: by indicating that a device is a candidate to enter a sleep mode in one or more links with an identifier information bit in a message frame, and determining, based on a message frame to confirm or reject the device to enter a sleep mode in a sleep-mode-candidate link indicated by the identifier information bit, whether to enter a sleep mode in the sleep-mode-candidate link indicated by the identifier information bit, it can effectively determine whether the device enters a sleep mode in a case of multi-link communication.

An embodiment of the present disclosure provides a device power saving method. In this method, data frames are transmitted at the same time in multiple links between a first device and a second device, that is, under multi-link communication. The first device generates a message frame including an identifier information bit, which is referred to as a first message frame. The identifier information bit included in the first message frame is used to indicate that the first device is a candidate to enter a sleep mode in one or more links of multiple links for transmitting data frames with the second device. The first device sends the generated first message frame to the second device. Upon receiving the first message frame, the second device feeds back a message frame to the first device to confirm or reject the first device to enter a sleep mode in the one or more sleep-mode-candidate links indicated by the identifier information bit. The message frame to confirm or reject the first device to enter a sleep mode in the one or more sleep-mode-candidate links indicated by the identifier information bit is referred to as a second message frame hereunder. The first device receives the second message frame fed back by the second device and then determines whether to enter a sleep mode in the one or more sleep-mode-candidate links indicated by the identifier information bit based on the second message frame. Further, when the second message frame indicates that the first device is confirmed to enter a sleep mode in the one or more sleep-mode-candidate links indicated by the identifier information bit, the first device can enter a sleep mode under multi-link communication, thus satisfying the needs of IEEE802.11be for communication with device power saving under multi-link communication.

Figure 2:
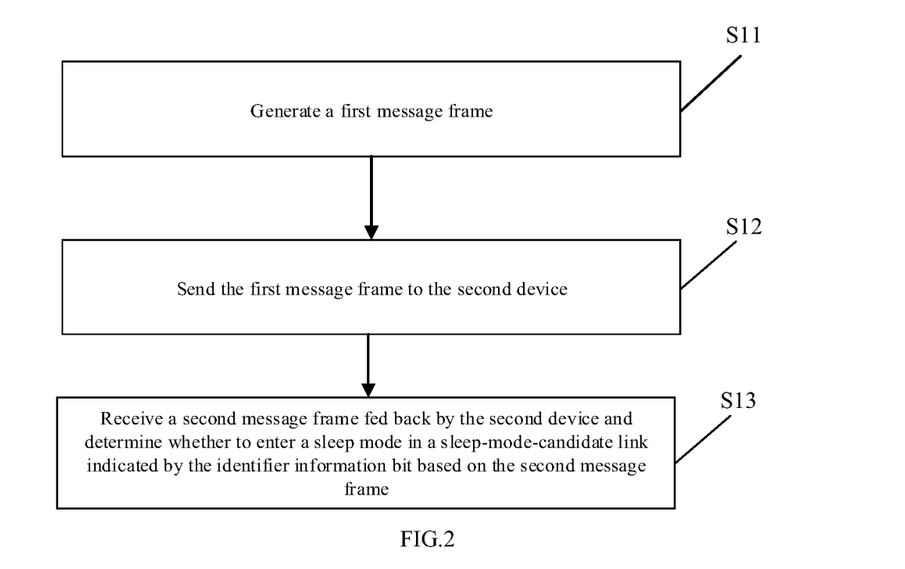
FIG. 2 is a flowchart illustrating a device power saving method according to an embodiment of the present disclosure.

FIG. 2 is a flowchart illustrating a device power saving method according to an embodiment of the present disclosure. As shown in FIG. 2, the device power saving method is applied to a first device. The first device may be a STA or AP. Data frames are transmitted in multiple links between a second device and the first device at the same time. The second device may be an AP or STA. The device power saving method may include the following steps.

At step S11, a first message frame is generated.

In an embodiment of the present disclosure, the first message frame includes an identifier information bit used to indicate the first device is a candidate to enter a sleep mode in one or more links of the multiple links.

At step S12, the first message frame is sent to the second device.

In an embodiment of the present disclosure, the first device sends the first message frame to the second device. The second device receives the first message frame from the first device and then determines whether to allow the first device to enter a sleep mode based on actual situations, and feeds back a second message frame to confirm or reject the first device to enter a sleep mode to the first device. For example, after correctly completing receptions of all data frames transmitted from the first device, the second device may confirm the first device to enter a sleep mode. When determining a communication with the first device is not completed, the second device may reject the first device to enter a sleep mode.

At step S13, a second message frame fed back by the second device is received and whether to enter a sleep mode in a sleep-mode-candidate link indicated by the identifier information bit is determined based on the second message frame.

In an embodiment of the present disclosure, the second message frame is used to confirm or reject the first device to enter a sleep mode in the sleep-mode-candidate link indicated by the identifier information bit. When the second message frame is used to confirm the first device to enter a sleep mode in the sleep-mode-candidate link indicated by the identifier information bit, the first device determines to enter a sleep mode in the sleep-mode-candidate link indicated by the identifier information bit. When the second message frame is used to reject the first device to enter a sleep mode in the sleep-mode-candidate link indicated by the identifier information bit, the first device does not enter a sleep mode in the sleep-mode-candidate link indicated by the identifier information bit but continues communication.

In the device power saving method provided by the embodiments of the present disclosure, the first device can enter a sleep mode under multi-link communication, thus satisfying the needs of IEEE802.11be for communication with device power saving under multi-link communication.

In embodiments of the present disclosure, a process of entering a sleep mode under multi-link communication as mentioned above will be described below in combination with practical applications.

Embodiments of the present disclosure will be described below with the first device as a STA and the second device as an AP. In some examples, the first device may also be an AP and the second device may also be a STA, which is not limited in the embodiments of the present disclosure.

Figure 3:
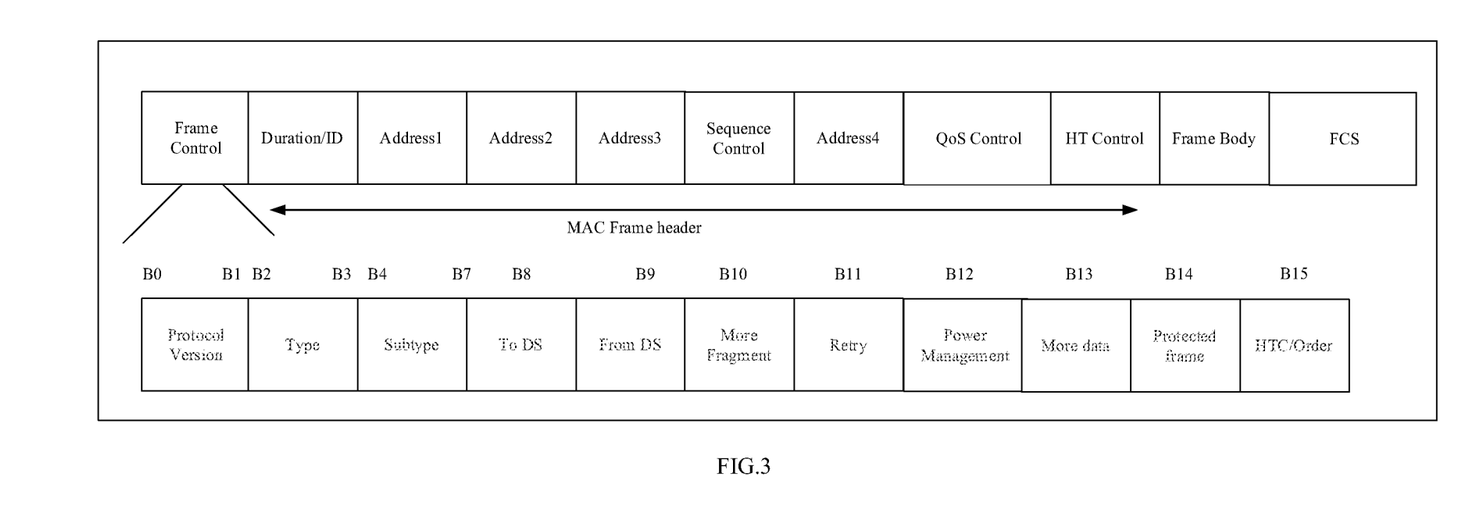
FIG. 3 is a schematic diagram illustrating a format of an identifier information bit according to an embodiment of the present disclosure.

In an embodiment of the present disclosure, a first message frame generated by a STA may be a data message frame or management message frame. When performing multi-link communication with an AP, the STA may set an identifier information bit in a Power Management subfield included in a Frame Control (FC) field in a media access control (MAC) frame header of the data message frame or management message frame. FIG. 3 is a schematic diagram illustrating a format of an MAC frame header according to an embodiment of the present disclosure.

In an embodiment of the present disclosure, the identifier information bit in the first message frame may be a bit, and different bit values may be obtained by bit setting. Different bits have different values. The bits of different values may be used to indicate whether the first device is a candidate to enter a sleep mode. For example, when the bit in the power management subfield in the FC field of the MAC frame header is set to "1", it indicates the STA is a candidate to enter a sleep mode (power saving mode). When the bit in the power management subfield in the FC field of the MAC frame header is set to "0", it indicates the STA is not a candidate to enter a sleep mode but will continue data frame transmission.

In an embodiment of the present disclosure, the STA may select to or not to enter a sleep mode respectively in each of multiple links. Thus, the STA may respectively send the first message frame to the AP in each link of the multiple links and indicate whether to enter a sleep mode in a current link in each of the first message frames sent over the multiple links.

In an embodiment of the present disclosure, if the STA enters a sleep mode in all links for performing multi-link communication with the AP, the STA may wake up and monitor a cache downlink data frame in links associated with the AP and obtain time synchronization information for maintaining synchronous communication with the AP.

Furthermore, in an embodiment of the present disclosure, the STA usually enters a sleep mode after completing transmissions of all data frames. As a result, in an embodiment of the present disclosure, in order to ensure the data frames are completely sent, the STA may send the first message frame to the AP after completing data frame transmission. For example, when the first message frame is a data message frame, the data message frame is a last data frame that the STA sends to the AP in the current link. When the first message frame is a management message frame, the STA may send the management message frame after completing sending all data frames to the AP in the current link.

Furthermore, in an embodiment of the present disclosure, the second message frame may be a Acknowledge (ACK) frame. An identifier information bit to confirm or reject the STA to enter a sleep mode is set in a power management subfield in a FC field of an MAC frame header of the ACK frame. For example, when the power management subfield of the FC field of the ACK frame is set to "1", it indicates that the STA can enter a sleep mode. When the power management subfield of the FC field of the ACK frame is set to "0", it indicates that the STA cannot enter a sleep mode.

Figure 4:
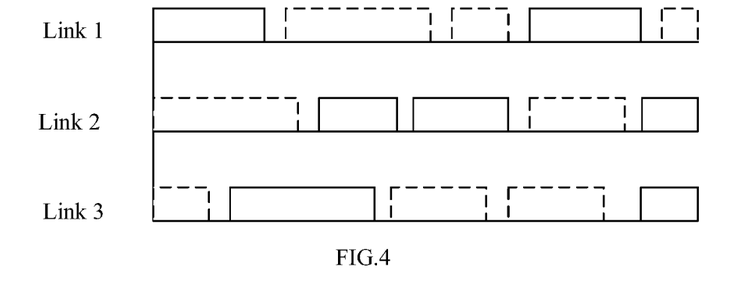
FIG. 4 is a schematic diagram illustrating an asynchronous communication mode according to an embodiment of the present disclosure.
Figure 5:
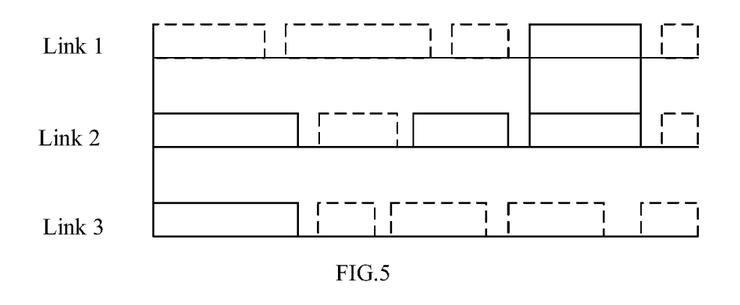
FIG. 5 is a schematic diagram illustrating a synchronous communication mode according to an embodiment of the present disclosure.

In IEEE802.11be, there may be two multi-link communication modes between a STA and an AP: asynchronous (or independent) communication mode and synchronous (or simultaneous) communication mode. In the asynchronous communication mode, access channels under each link in multiple links are independent of each other. As shown in FIG. 4, a link 1, a link 2 and a link 3 are in asynchronous communication mode and data frames transmitted by the STA under the three links are independent of each other and are asynchronously transmitted. In the synchronous communication mode, the access channels under each of the links are mutually associated. As shown in FIG. 5, the data frames transmitted by the STA in the links 1 and 2 have synchronous transmission and the data frames transmitted in the links 2 and 3 have synchronous transmission.

In the asynchronous communication mode, the access channels under each link are independent of each other. Therefore, when multi-link communication is performed between the STA and the AP in such mode, a first message frame may be generated for each link of the multiple links and sent in each link of the multiple links. For example, when a power management subfield in a FC field of a MAC frame header of the data frame or management frame sent in each link is set to "1", it indicates that the STA is a candidate to enter a sleep mode in each link.

If the STA enters a sleep mode in all links for performing multi-link communication with the AP, the STA may wake up and monitor a cache downlink data frame in links associated with the AP, and obtain time synchronization information for maintaining synchronous communication with the AP.

In the synchronous communication mode, the access channels under each link are mutually associated. Therefore, when the STA communicates with the AP in such mode, on one hand, a first message frame may be generated for each link of the multiple links and sent in each link of the multiple links, and, on the other hand, the first message frame may also be sent to the AP in the links associated with the AP. The identifier information bit in the first message frame is used to indicate that the STA is a candidate to enter a sleep mode in the multiple links for performing synchronous communication. For example, in the synchronous communication process shown in FIG. 4, the STA may send the first message frame to the AP in the links associated with the AP, and the identifier information bit in the first message frame may be used to indicate the STA will enter a sleep mode in the links 1 and 2, and may also be used to indicate the STA will enter a sleep mode in the links 2 and 3. In the embodiments of the present disclosure, in the synchronous communication mode, the first message frame sent in one link indicates the STA will enter a sleep mode in multiple links for synchronous communication, thus there may be a plurality of the identifier information bits in the first message frame. A number of the identifier information bits may be determined based on a number of the links for currently performing synchronous communication, so as to ensure it can indicate that the STA is a candidate to enter a sleep mode in all links for currently performing synchronous communication. For example, in an embodiment of the present disclosure, the STA may set a plurality of bits in the power management subfield in the FC field of the MAC frame header of the data frame sent in the links associated with the AP. Each of the plurality of bits is used to indicate whether the STA is a candidate to enter a sleep mode in one link. For example, when the bit is set to "1", it indicates that the STA is a candidate to enter a sleep mode in the link; when the bit is set to "0", it indicates that the STA is not a candidate to enter a sleep mode in the link.

In another embodiment of the present disclosure, the STA may preset one more bit in the power management subfield of the FC field in the MAC frame header of the data frame sent in the links associated with the AP to indicate that the STA is a candidate to enter a sleep mode in all links for currently performing synchronous communication. If the preset one bit in the MAC frame header is set to "1", it indicates that the power management subfields in the FC fields of all links are set to "1" and the STA is a candidate to enter a sleep mode. If the preset one bit in the MAC frame header is set to "0", it indicates that the power management subfields in the FC fields of a part of the multiple links for synchronous communication are set to "1" and the STA is a candidate to enter a sleep mode. In addition, it also indicates that the power management subfields in the FC fields of a part of the multiple links for synchronous communication are set to "0", the STA is not a candidate to enter a sleep mode but will continue communication.

If the STA enters a sleep mode in all links for performing multi-link communication with the AP, the STA may wake up and monitor a cache downlink data frame in the links associated with the AP and obtain time synchronization information for maintaining synchronous communication with the AP, or, the STA may randomly select a link to wake up for maintaining time synchronization with the AP, or the STA may wake up in a link specified by the AP to maintain time synchronization with the AP.

In an embodiment of the present disclosure, when performing multi-link communication with the AP, the STA may switch a sleep-mode-candidate link in some links. For example, in a case of a high load of a link, the STA may dynamically switch to a link with lower load to continue communication and the link with a high load may enter a sleep mode, or a link in a sleep mode may be switched to continue communication. In an embodiment of the present disclosure, when determining to switch a sleep-mode-candidate link, the identifier information bit in the first message frame for indicating the sleep-mode-candidate link needs to be updated.

In the above embodiments of the present disclosure, when the STA performs multi-link communication with the AP, the identifier information bit indicates entering a sleep mode, such that the STA can enter a sleep mode under multi-link communication, thus meeting the needs of IEEE802.11be for multi-link communication.

Figure 6:
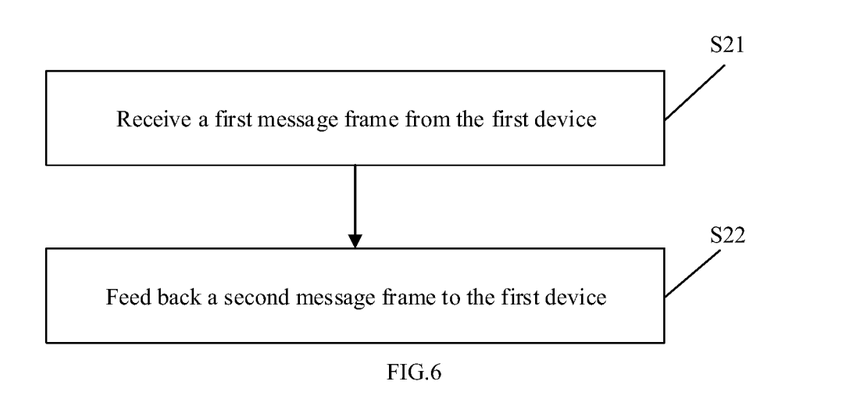
FIG. 6 is a flowchart illustrating a device power saving method according to an embodiment of the present disclosure.

FIG. 6 is a flowchart illustrating a device power saving method according to an embodiment of the present disclosure. As shown in FIG. 6, the device power saving method is applied to a second device. The second device may be an AP or STA. Data frames are transmitted at the same time in multiple links between the second device and a first device. The first device may be a STA or AP. The device power saving method includes following steps.

At step S21, a first message frame is received from the first device.

The first message frame includes an identifier information bit used to indicate that the first device is a candidate to enter a sleep mode in one or more links of multiple links.

At step S22, a second message frame is fed back to the first device.

After receiving the first message frame from the first device, the second device may determine whether allowing the first device to enter a sleep mode in a sleep-mode-candidate link indicated by the identifier information bit based on actual situations, and feed back the second message frame to the first device to confirm or reject the first device to enter a sleep mode in the sleep-mode-candidate link indicated by the identifier information bit. For example, after correctly completing receiving data frames from the first device in the sleep-mode-candidate link indicated by the identifier information bit, the second device may confirm the first device to enter a sleep mode in the sleep-mode-candidate link indicated by the identifier information bit. When determining a communication with the first device is not completed in the sleep-mode-candidate link indicated by the identifier information bit, the second device may reject the first device to enter a sleep mode in the sleep-mode-candidate link indicated by the identifier information bit.

In an embodiment of the present disclosure, the second message frame may be a Acknowledge (ACK) frame. An identifier information bit to confirm or reject the first device such as a STA to enter a sleep mode is set in a power management subfield in a FC field of an MAC frame header of the ACK frame. For example, when the power management subfield of the FC field of the ACK frame is set to "1", it indicates that the first device is confirmed to enter a sleep mode in the sleep-mode-candidate link indicated by the identifier information bit. When the power management subfield of the FC field of the ACK frame is set to "0", it indicates that the first device is reject to enter a sleep mode in the sleep-mode-candidate link indicated by the identifier information bit, that is, the first device cannot enter a sleep mode in the sleep-mode-candidate link indicated by the identifier information bit.

In an embodiment of the present disclosure, the process in which the second device receives the first message frame and feeds back the second message frame may correspond to the process in which the first device sends the first message frame. For example, the second device may receive the first message frame from the first device in each of the multiple links. The identifier information bit in the first message frame is used to indicate the first device is a candidate to enter a sleep mode in a current link for sending the first message frame. Further, the second device feeds back the second message frame to the first device in each of the multiple links.

For example, data frames are transmitted based on asynchronous communication mode in multiple links between the first device and the second device. Since the access channels are independent of each other, the second device such as an AP may reply an ACK frame in each link. When the power management subfield in the FC field of the ACK frame is set to "1", it indicates that the STA as the first device may enter a sleep mode.

In an embodiment of the present disclosure, it is possible that an ACK frame is replied in a certain link to confirm the STA to enter a sleep mode, where the power management subfield in the FC field of the ACK frame is set to "1".

Data frames are transmitted based on synchronous communication mode in multiple links between the first device and the second device. The second device receives the first message frame from the first device in one or more links associated with the second device. The identifier information bit in the first message frame is used to indicate the first device is a candidate to enter a sleep mode in multiple links for performing synchronous communication.

For example, the AP may receive a data frame/association frame sent by the STA in each link at the same time, but an ACK frame is replied in one link to indicate that the STA is confirmed to enter a sleep mode. If the STA sends the first message frame in the form of an association frame newly added with a preset bit which is, for example, set to "1", the AP also sets the power management subfield in the FC field of the MAC frame header of the ACK frame to "1" to indicate that the STA is confirmed to enter a sleep mode in all links. If the STA sets the newly-added preset bit in the association frame to "0", the AP also sets the power management subfield in the FC field of the MAC frame header of the ACK frame to "0" to indicate that the STA is confirmed to enter a sleep mode in some links or a sleep-mode-candidate link is switched based on the first message frame.

In an embodiment of the present disclosure, the first message frame may be a data message frame or a management message frame. The MAC frame header of the data message frame or management message frame includes a Frame Control field, the Frame Control field includes a power management subfield, and the power management subfield includes an identifier information bit.

When the first message frame is a data message frame, the second device receives the first message frame by receiving a last data frame in the current link. When the first message frame is a management message frame, the second device receives the first message frame after completing receiving all data frames in the current link.

Figure 7:
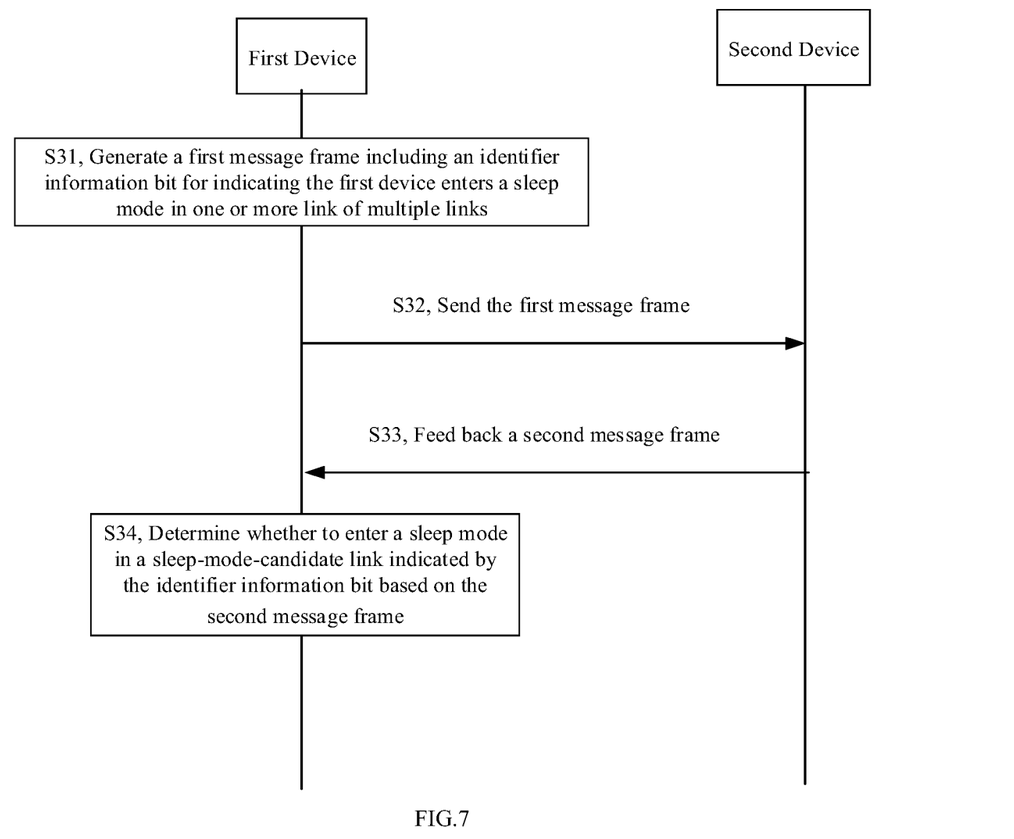
FIG. 7 is an interactive flowchart illustrating a device power saving method according to an embodiment of the present disclosure.

FIG. 7 is a flowchart illustrating a device power saving method according to an embodiment of the present disclosure. As shown in FIG. 7, the device power saving method is applied in a process of an interaction between a first device and a second device. Referring to FIG. 7, the method includes the following steps.

At step S31, the first device generates a first message frame.

The first message frame includes an identifier information bit used to indicate the first device is a candidate to enter a sleep mode in one or more links of multiple links.

At step S32, the first device sends the first message frame to the second device and the second device receives the first message frame from the first device.

At step S33, the second device feeds back a second message frame to the first device, and the first device receives the second message frame fed back by the second device.

In an embodiment of the present disclosure, the second message frame is used to confirm or reject the first device to enter a sleep mode.

At step S34, the first device determines whether to enter a sleep mode in a sleep-mode-candidate link indicated by the identifier information bit based on the second message frame.

When the second message frame is used to confirm first device to enter a sleep mode in the sleep-mode-candidate link indicated by the identifier information bit, the first device determines to enter a sleep mode in the sleep-mode-candidate link indicated by the identifier information bit. When the second message frame is used to reject the first device to enter a sleep mode, the first device does not enter a sleep mode but continues communication.

It may be understood that the implementation processes of the first device and the second device involved in the above embodiments during communication process with device power saving are applicable to each other and also may be applied to the implementation process of interactions between the first device and the second devices in the embodiments of the present disclosure. Therefore, in the embodiments of the present disclosure, the implementation process of interactions between the first device and the second device in communication with device power saving can be referred to the relevant descriptions of the above embodiments and will not be repeated herein.

Based on the same concept, embodiments of the present disclosure further provide a device power saving apparatus.

It is understood that the device power saving apparatus provided by the embodiments of the present disclosure may include corresponding hardware structures and/or software modules for executing corresponding functions so as to achieve the above functions. In combination with units and algorithm steps exemplified in the embodiments of the present disclosure, the embodiments of the present disclosure may be implemented by hardware or combination of hardware and computer software. Whether a particular function is executed by hardware or by driving hardware using computer software will depend on the specific applications and designed constraint conditions of the technical solutions. Those skilled in the art may execute the described functions for each specific application by a different method but the implementation shall not be considered as exceeding the scope of the technical solutions of the embodiments of the present disclosure.

Figure 8:
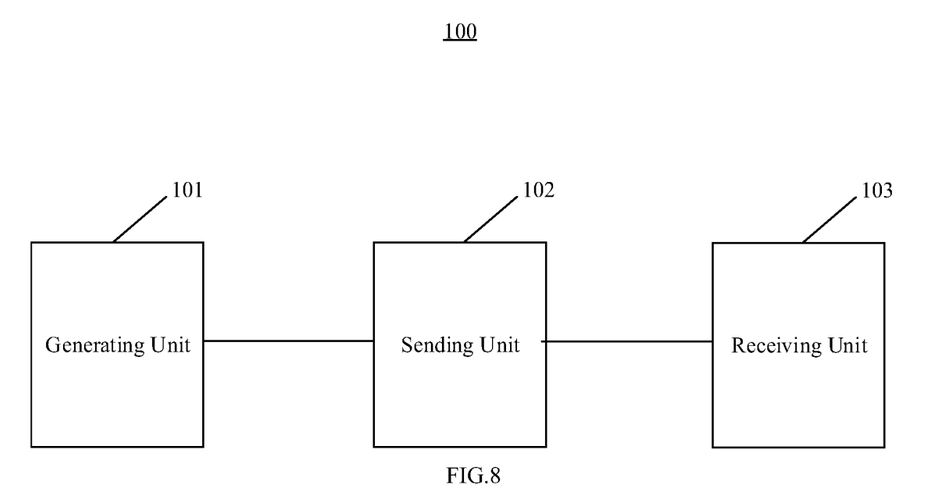
FIG. 8 is a block diagram illustrating a device power saving apparatus according to an embodiment of the present disclosure.

FIG. 8 is a block diagram illustrating a device power saving apparatus according to an embodiment of the present disclosure. As shown in FIG. 8, the device power saving apparatus 100 includes a generating unit 101, a sending unit 102 and a receiving unit 103.

The generating unit 101 is configured to generate a first message frame, where the first message frame includes an identifier information bit used to indicate that a first device is a candidate to enter a sleep mode in one or more links of multiple links. The sending unit 102 is configured to send the first message frame to a second device. The receiving unit 103 is configured to receive a second message frame fed back by the second device, and determine whether to enter a sleep mode in a sleep-mode-candidate link indicated by the identifier information bit based on the second message frame, where the second message frame is used to confirm or reject the first device to enter a sleep mode in the sleep-mode-candidate link indicated by the identifier information bit.

In an implementation, the sending unit 102 is configured to send the first message frame to the second device in each of the multiple links, where the identifier information bit is used to indicate the first device is a candidate to enter a sleep mode in a current link for sending the first message frame.

Data frames are transmitted based on asynchronous communication mode in the multiple links between the first device and the second device. The sending unit 102 is configured to send the first message frame to the second device in each of the multiple links, where the identifier information bit is used to indicate the first device is a candidate to enter a sleep mode in the current link for sending the first message frame.

In another implementation, data frames are transmitted based on synchronous communication mode in the multiple links between the first device and the second device. The sending unit 102 is configured to send the first message frame to the second device in one or more links associated with the second device, where the identifier information bit is used to indicate the first device is a candidate to enter a sleep mode in multiple links for performing synchronous communication.

A number of the identifier information bits is determined based on a number of the links for currently performing synchronous communication.

In another implementation of the present disclosure, the generating unit 101 is further configured to, when determining to switch a sleep-mode-candidate link, update the identifier information bit.

In another implementation, the receiving unit 103 is further configured to, when determining the first device is a candidate to enter a sleep mode in all links for transmitting data frames with the second device, monitor a cache downlink data frame in the one or more links associated with the second device, and obtain time synchronization information for maintaining synchronous communication with the second device.

In another implementation, the first message frame is a data message frame, and the data message frame is a last data frame the first device sends to the second device in the current link, or, the first message frame is a management message frame, and the management message frame is sent after the first device completes sending all data frames to the second device in the current link.

In another implementation, the second message frame is a reply acknowledgement (ACK) frame.

An MAC frame header of the ACK frame includes a Frame Control field, the Frame Control field includes a power management subfield, and the power management subfield includes an identifier information bit used to confirm or reject the first device to enter a sleep mode.

Figure 9:
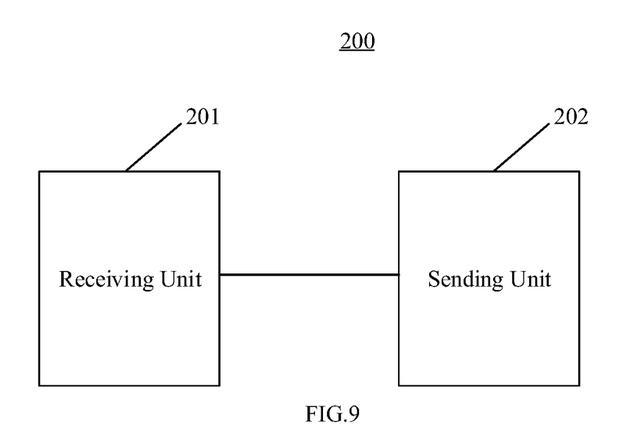
FIG. 9 is a block diagram illustrating a device power saving apparatus according to an embodiment of the present disclosure.

FIG. 9 is a block diagram illustrating a device power saving apparatus according to an embodiment of the present disclosure. As shown in FIG. 9, the device power saving device 200 includes a receiving unit 201 and a sending unit 202.

The receiving unit 201 is configured to receive a first message frame from a first device, where the first message frame includes an identifier information bit used to indicate that the first device is a candidate to enter a sleep mode in one or more links of multiple links; the sending unit 202 is configured to feed back a second message frame to the first device, where the second message frame is used to confirm or reject the first device to enter a sleep mode in a sleep-mode-candidate link indicated by the identifier information bit.

In an implementation, the receiving unit 201 is configured to receive the first message frame from the first device in each of the multiple links, where the identifier information bit is used to indicate the first device enters a sleep mode in a current link for sending the first message frame. The sending unit 202 is configured to feed back the second message frame to the first device in each of the multiple links.

In another implementation, data frames are transmitted based on asynchronous communication mode in the multiple links between the first device and the second device. The receiving unit 201 is configured to receive the first message frame from the first device in each of the multiple links, where the identifier information bit is used to indicate the first device is a candidate to enter a sleep mode in a current link for sending the first message frame. The sending unit 202 is configured to feed back the second message frame to the first device in each of the multiple links.

In another implementation, data frames are transmitted based on synchronous communication mode in the multiple links between the first device and the second device. The receiving unit 201 is configured to receive the first message frame from the first device in one or more links associated with the second device, where the identifier information bit is used to indicate the first device is a candidate to enter a sleep mode in multiple links for performing synchronous communication. The sending unit 202 is configured to feed back the second message frame to the first device in the one or more links associated with the second device.

In another implementation, the first message frame is a data message frame or a management message frame. An MAC frame header of the data message frame or management message frame includes a Frame Control field, the Frame Control field includes a power management subfield, and the power management subfield includes an identifier information bit.

When the first message frame is a data message frame, the receiving unit is configured to receive the first message frame by receiving a last data frame in the current link. When the first message frame is a management message frame, the receiving unit is configured to receive the first message frame after completing receiving all data frames in the current link.

In another implementation, the second message frame is an ACK frame. An MAC frame header of the ACK frame includes a Frame Control field, the Frame Control field includes a power management subfield, and the power management subfield includes an identifier information bit used to confirm or reject the first device to enter a sleep mode in a sleep-mode-candidate link indicated by the identifier information bit.

The specific manner in which various modules in the apparatus of the above embodiments of the present disclosure perform operations is already detailed in the method embodiments and will not be repeated here.

Figure 10:
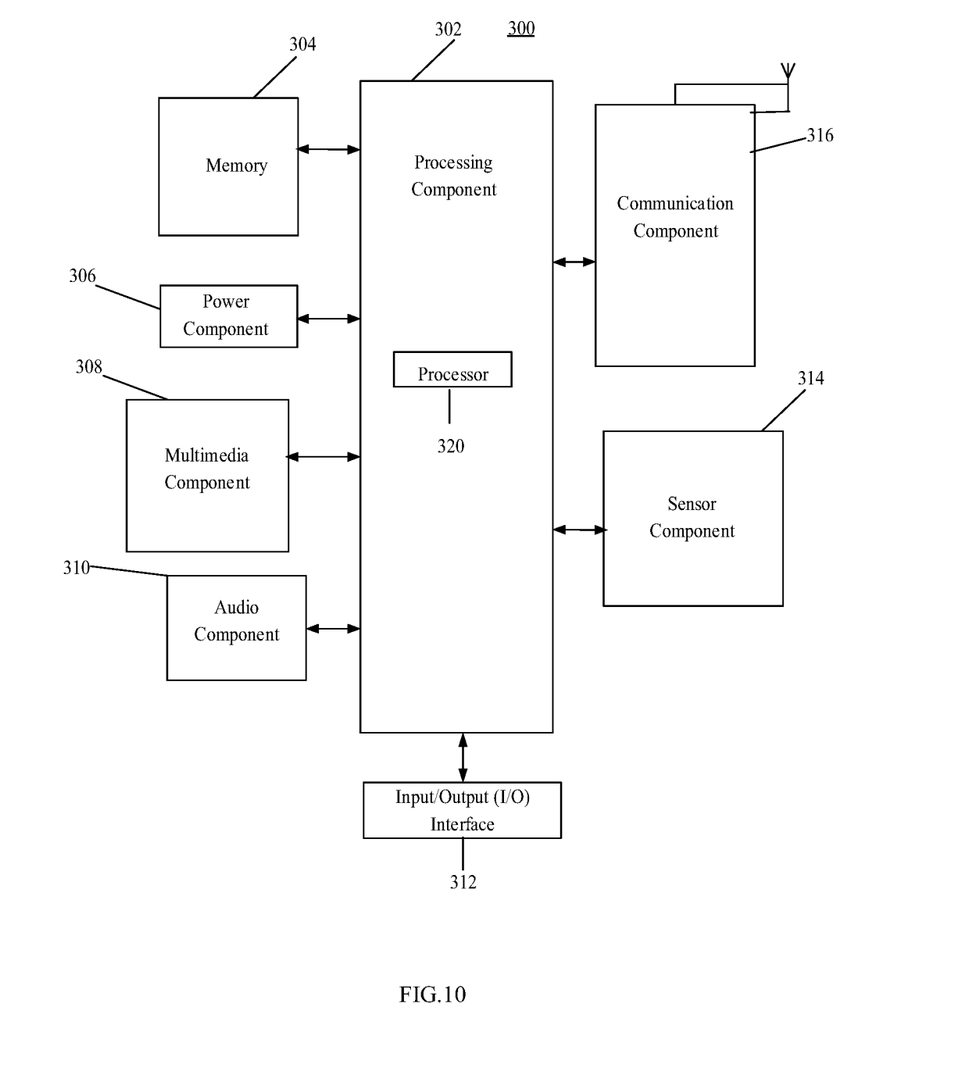
FIG. 10 is a block diagram illustrating an apparatus for device power saving according to an embodiment of the present disclosure.

FIG. 10 is a block diagram of a device power saving apparatus 300 according to an embodiment of the present disclosure. For example, the apparatus 300 may be a STA, or an AP. For example, the apparatus 300 may be a mobile phone, a computer, a digital broadcast terminal, a message transceiver, a game console, a tablet device, a medical device, a fitness device, a personal digital assistant, and the like.

With reference to FIG. 10, the apparatus 300 may include one or more of the following components: a processing component 302, a memory 304, a power component 306, a multimedia component 308, an audio component 310, an input/output (I/O) interface 312, a sensor component 314 and a communication component 316.

The processing component 302 generally controls overall operations of the apparatus 300, such as operations associated with display, phone calls, data communications, camera operations, recording operations and the like. The processing component 302 may include one or more processors 320 to execute instructions to complete all or part of the steps of the above methods. In addition, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the apparatus 300. Examples of such data include instructions for any application or method, contact data, phonebook data, messages, pictures, videos, and so on operated on the apparatus 300. The memory 304 may be implemented by any type of volatile or non-volatile storage devices or a combination of the volatile and non-volatile storage devices, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, a compact disk and so on.

The power component 306 supplies power for different components of the apparatus 300. The power component 306 may include a power supply management system, one or more power supplies, and other components associated with generating, managing and distributing power for the apparatus 300.

The multimedia component 308 includes a screen that provides an output interface between the apparatus 300 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 308 includes a front camera and/or a rear camera. When the apparatus 300 is in an operation mode, such as a shooting mode or a video mode, the front camera and/or the rear camera may receive external multimedia data. Each of the front and rear cameras may be a fixed optical lens system or have a focal length and an optical zoom capability.

The audio component 310 is configured to output and/or input audio signals. For example, the audio component 310 includes a microphone (MIC) configured to receive an external audio signal when the apparatus 300 is in an operation mode, such as a call mode, a recording mode, and a voice recognition mode. The received audio signal may be further stored in the memory 304 or transmitted via the communication component 316. In some examples, the audio component 310 also includes a loudspeaker for outputting an audio signal.

The I/O interface 312 provides an interface between the processing component 302 and a peripheral interface module which may be a keyboard, a click wheel, a button, or the like. These buttons may include, but are not limited to a home button, a volume button, a start button, and a lock button.

The sensor component 314 includes one or more sensors for providing a status assessment in various aspects to the apparatus 300. For example, the sensor component 314 may detect an open/closed state of the apparatus 300, and the relative positioning of components, for example, the component may be a display and a keypad of the apparatus 300. The sensor component 314 may also detect a change in position of the apparatus 300 or a component of the apparatus 300, the presence or absence of a user in contact with the apparatus 300, the orientation or acceleration/deceleration of the apparatus 300 and a change in temperature of the apparatus 300. The sensor component 314 may include a proximity sensor configured to detect the presence of nearby objects without any physical contact. The sensor component 314 may also include a light sensor, such as a CMOS or CCD image sensor, for use in imaging applications. In some examples, the sensor component 314 may also include an acceleration sensor, a gyro sensor, a magnetic sensor, a pressure sensor, a temperature sensor and the like.

The communication component 316 is configured to facilitate wired or wireless communication between the apparatus 300 and other devices. The apparatus 300 may access a wireless network based on a communication standard, such as WiFi, 2G or 3G, or a combination of the above communication standards or the like. In an example, the communication component 316 receives broadcast signals or broadcast associated information from an external broadcast management system via a broadcast channel In an example, the communication component 316 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, or other technologies.

In an example, the apparatus 300 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronic elements for performing the above methods.

In an example, there is further provided a non-transitory computer readable storage medium including instructions, for example, a memory 304 including instructions, where the above instructions may be executed by the processor 320 of the apparatus 300 to complete the above methods. For example, the non-transitory computer readable storage medium may be Read Only Memory (ROM), Random Access Memory (RAM), CD-ROM, magnetic tape, floppy disk and optical data storage device and the like.

Figure 11:
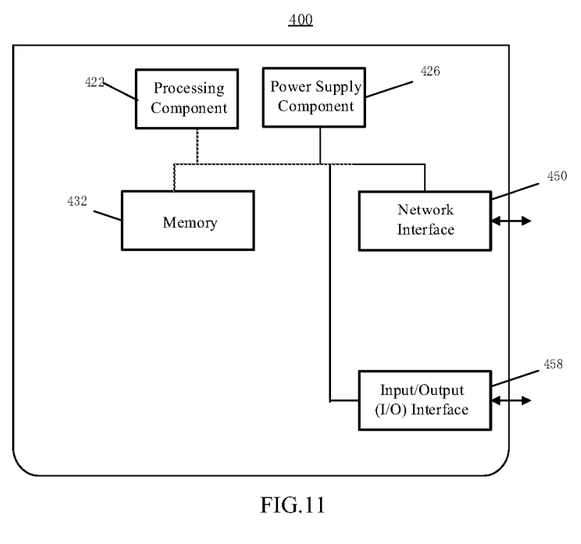
FIG. 11 is a block diagram illustrating an apparatus for device power saving according to an embodiment of the present disclosure.

FIG. 11 is a block diagram of an apparatus 400 according to an embodiment of the present disclosure. For example, the apparatus 400 may be provided as a server. As shown in FIG. 11, the apparatus 400 may include a processing component 422 which further includes one or more processors and memory resources represented by a memory 432 for storing instructions executable by the processing component 422, for example, an application program. The application program stored in the memory 432 may include one or more modules, each of which corresponds to one set of instructions. Further, the processing component 422 is configured to execute instructions to perform the above method.

The apparatus 400 further includes one power supply component 426 configured to execute power management for the apparatus 400, one wired or wireless network interface 450 configured to connect the apparatus 400 to a network, and one input/output (I/O) interface 458. The apparatus 400 may be operated based on an operating system stored in the memory 432, such as Windows Server™, Mac OS X™, Unix™, Linux™ and FreeBSD™.

It is further understood that "plurality" in the present disclosure refers to two or more and other quantifiers have the similar meanings. The "and/or" is used to describe association relationship of associated objects and represent three relationships, for example, A and/or B may represent that A exists alone, both A and B exist at the same time, and B exists alone. The character "/" generally represents an "or" relationship of the objects associated back and forth. The terms "a", "said" and "the" in singular forms are also meant to include plural form, unless otherwise clearly stated in the context.

It is to be understood that although different information may be described by using the terms such as first, second and the like. in the present disclosure, these information should not be limited to these terms. These terms are used only to distinguish the same type of information from each other rather than represent a specific sequence or degree of importance. Actually, the expressions of "first" and "second" and the like may be interchanged completely. For example, without departing from the scope of the present disclosure, the first message frame may also be referred to as the second message frame and similarly, the second message frame may also be referred to as the first message frame.

Further, it may be understood that operations are described in a specific sequence in the accompanying drawings in the embodiments of the present disclosure, it shall not be understood as requiring these operations to be performed in the shown specific sequence or serial sequence, or all operations shown to be performed to achieve a desired result. In a specific environment, multi-task processing and parallel processing are possible and may also be advantageous.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A device power saving method, being applied to a first device which simultaneously communicates data frames with a second device via a plurality of links, the device power saving method comprising:

generating a first message frame, wherein the first message frame comprises an identifier information bit used to indicate to enter a power saving mode in one or more links of the plurality of links;

sending the first message frame to the second device in each of the plurality of links;

receiving a second message frame fed back by the second device in each of the plurality of links, determining whether to enter a sleep mode in a sleep-mode-candidate link indicated by the identifier information bit based on the second message frame, wherein the second message frame is used to confirm or reject the first device to enter a sleep mode in the sleep-mode-candidate link indicated by the identifier information bit, and determining that the first device enters a sleep mode in all links with the second device, and then monitoring a cache downlink data frame in a random one of the plurality of links associated with the second device and obtaining time synchronization information for maintaining synchronous communication with the second device while all the plurality of links with the second device are in the power saving mode.

2. The device power saving method of claim 1, wherein sending the first message frame to the second device comprises:

sending the first message frame to the second device in each of the plurality of links, wherein the identifier information bit is used to indicate that the first device is a candidate to enter a sleep mode in a current link for sending the first message frame.

3. The device power saving method of claim 1, wherein the first device communicating data frames with the second device via the plurality of links is based on synchronous communication mode;

sending the first message frame to the second device comprises:

sending the first message frame to the second device in one or more links associated with the second device, wherein the identifier information bit is used to indicate that the first device is a candidate to enter a sleep mode in a plurality of links for synchronous communication.

4. The device power saving method of claim 3, wherein the number of the identifier information bits is determined based on the number of links for current synchronous communication.

5. The device power saving method of claim 3, further comprising:

in response to determining to switch a sleep-mode-candidate link, updating the identifier information bit.

6. The device power saving method of claim 1, wherein the first message frame is a data message frame or a management message frame;

a media access control, MAC, frame header of the data message frame or the management message frame comprises a Frame Control field, the Frame Control field comprises a power management subfield and the power management subfield comprises the identifier information bit.

7. The device power saving method of claim 6, wherein in case that the first message frame is the data message frame, the data message frame is a last data frame sent by the first device to the second device in current link;

in case that the first message frame is the management message frame, the management message frame is sent after the first device completes transmission of all data frames to the second device in current link.

8. The device power saving method of claim 1, wherein the second message frame is a reply acknowledgement, ACK, frame;

an MAC frame header of the ACK frame comprises a Frame Control field, the Frame Control field comprises a power management subfield, and the power management subfield comprises an identifier information bit used to confirm or reject the first device to enter a sleep mode.

9. A device power saving apparatus, comprising:
a processor; and
a memory storing processor-executable instructions;
wherein, when the processor executes the processor-executable instructions, the processor is configured to perform operations comprising:
generating a first message frame, wherein the first message frame comprises an identifier information bit used to indicate to enter a power saving mode in one or more links of a plurality of links;
sending the first message frame to a second device in each of the plurality of links;
receiving a second message frame fed back by the second device in each of the plurality of links,
determining whether to enter a sleep mode in a sleep-mode-candidate link indicated by the identifier information bit based on the second message frame, wherein the second message frame is used to confirm or reject a first device to enter a sleep mode in the sleep-mode-candidate link indicated by the identifier information bit, and
determining that the first device enters a sleep mode in all links with the second device, and then monitoring a cache downlink data frame in a random one of the plurality of links associated with the second device and obtaining time synchronization information for maintaining synchronous communication with the second device while all the links with the second device are in the power saving mode.

10. The device power saving apparatus of claim 9, wherein sending the first message frame to the second device comprises:
sending the first message frame to the second device in each of the plurality of links, wherein the identifier information bit is used to indicate that the first device to enter a sleep mode in a current link for sending the first message frame.

* * * * *

UNITED STATES PATENT AND TRADEMARK OFFICE
CERTIFICATE OF CORRECTION

PATENT NO. : 12,389,328 B2
APPLICATION NO. : 17/775449
DATED : August 12, 2025
INVENTOR(S) : Xiandong Dong Page 1 of 1

It is certified that error appears in the above-identified patent and that said Letters Patent is hereby corrected as shown below:

On the Title Page

Item (56), under "OTHER PUBLICATIONS", in Column 2 Line 1, delete "property" and insert -- Property --, therefor.
On Page 2, Item (56), under "OTHER PUBLICATIONS", in Column 2 Line 4, delete "7 pages.(Submitted" and insert -- 7 pages. (Submitted --, therefor.

In the Specification

In Column 4 Line 51, delete "indicate the" and insert -- indicate that the --, therefor.
In Column 5 Line 58, delete "to or not" and insert -- to enter or not --, therefor.
In Column 7 Line 27, delete "one more" and insert -- one or more --, therefor.
In Column 9 Line 2, delete "reply an" and insert -- reply with an --, therefor.
In Column 14 Line 26, delete "channel" and insert -- channel. --, therefor.
In Column 15 Line 16, delete "in" and insert -- In --, therefor.
In Column 15 Line 19, delete "represent" and insert -- to represent --, therefor.

Signed and Sealed this
Twenty-eighth Day of October, 2025

John A. Squires
*Director of the United States Patent and Trademark Office*